US008783241B1

(12) United States Patent
Sauter et al.

(10) Patent No.: US 8,783,241 B1
(45) Date of Patent: Jul. 22, 2014

(54) DUTCH OVEN LID HOLDER

(75) Inventors: Gary E. Sauter, La Mesa, CA (US);
Dale A. Sauter, Salt Lake City, UT (US)

(73) Assignee: CompMaid, LLC, Salt Lake City, UT (US)

( * ) Notice: Subject to any disclaimer, the term of this patent is extended or adjusted under 35 U.S.C. 154(b) by 1500 days.

(21) Appl. No.: 11/405,344

(22) Filed: Apr. 18, 2006

(51) Int. Cl.
*F24C 1/16* (2006.01)
*A47J 37/07* (2006.01)

(52) U.S. Cl.
CPC ............... *F24C 1/16* (2013.01); *A47J 37/0704* (2013.01)
USPC ............ 126/25 R; 126/25 A; 126/30; 126/38; 126/44; 126/48; 126/50; 126/9 R; 248/163.2; 248/168; 248/188.5

(58) Field of Classification Search
CPC ........... F24C 1/16; F24C 3/14; A47J 37/0704
USPC ........ 126/9 R, 25 R, 30, 25 A, 38, 44, 48, 50; 220/379; D7/402, 334; 248/167, 168, 248/153, 175, 440, 150, 163.2, 188.5; 108/154; 211/85
See application file for complete search history.

(56) References Cited

U.S. PATENT DOCUMENTS

| 194,101 | A | * | 8/1877 | Muller | 126/25 R |
|---|---|---|---|---|---|
| 422,899 | A | * | 3/1890 | Adams et al. | 126/25 R |
| 463,495 | A | * | 11/1891 | Dermigny | 126/38 |
| 686,006 | A | * | 11/1901 | McConnell | 248/155.1 |
| 891,660 | A | * | 6/1908 | Boeck | 108/105 |
| 955,140 | A | * | 4/1910 | Cronk | 126/30 |
| 1,173,051 | A | * | 2/1916 | Smith | 248/649 |
| 1,207,106 | A | * | 12/1916 | Welsh | 108/28 |
| 1,304,405 | A | * | 5/1919 | Tate | 248/150 |
| 1,518,148 | A | * | 12/1924 | Kamenstein | 211/200 |
| 1,603,233 | A | * | 10/1926 | Conwell et al. | 108/154 |
| 2,094,915 | A | * | 10/1937 | Dawson | 126/25 R |
| 2,120,683 | A | * | 6/1938 | Simmons | 126/25 B |
| 2,154,165 | A | * | 4/1939 | Huntington | 126/25 B |
| 2,530,166 | A | * | 11/1950 | Johannsen | 126/25 R |
| 2,683,014 | A | * | 7/1954 | Sumen et al. | 248/150 |
| 2,787,995 | A | * | 4/1957 | Alter | 126/25 R |
| 3,094,113 | A | * | 6/1963 | Avila | 126/30 |
| 3,369,482 | A | * | 2/1968 | Kahn et al. | 99/450 |

(Continued)

FOREIGN PATENT DOCUMENTS

GB 2014038 A * 8/1979 ............. A47J 37/07

*Primary Examiner* — Kang Hu
*Assistant Examiner* — Anthony Kandare
(74) *Attorney, Agent, or Firm* — Goucher Patent Law; Tyler Goucher

(57) ABSTRACT

A Dutch oven lid holder having a horizontally oriented support ring. Three support leg members have their top ends telescopically received in tubular coupling members formed on the support ring. The area beneath the support ring and within the perimeter of the support leg members defines a lid storage space. A lid support assembly has a horizontally oriented tubular sleeve portion having a tension coil spring passing therethrough. The opposite ends of the coil spring are detachably secured to brackets on the support ring. A vertically oriented anchor leg has its top end adjustably received on a T-connector portion extending downwardly from the tubular sleeve portion. The anchor leg has a hook on its bottom end that loops under the handle of a Dutch oven lid. Anchor arms extending inwardly from the respective support leg members would maintain a downward force on the Dutch oven lid causing the coil spring to be place under tension.

6 Claims, 1 Drawing Sheet

(56) References Cited

U.S. PATENT DOCUMENTS

| | | | |
|---|---|---|---|
| 3,526,217 A * | 9/1970 | Garske et al. | 126/25 A |
| 4,063,703 A * | 12/1977 | Shy | 248/439 |
| 4,216,760 A * | 8/1980 | Wiggins | 126/508 |
| 4,284,058 A * | 8/1981 | Lutz | 126/9 R |
| 4,378,100 A * | 3/1983 | Minozzi et al. | 248/168 |
| 4,498,452 A * | 2/1985 | Schlosser et al. | 126/9 R |
| 4,508,094 A * | 4/1985 | Hait | 126/9 R |
| 4,528,975 A * | 7/1985 | Wang | 126/369 |
| D293,191 S * | 12/1987 | Stephen et al. | D7/332 |
| 4,763,640 A * | 8/1988 | Schnack et al. | 126/243 |
| 4,903,683 A * | 2/1990 | Larsen et al. | 126/25 B |
| 4,948,120 A * | 8/1990 | Krueger et al. | 297/274 |
| 5,038,749 A * | 8/1991 | Jerry et al. | 126/40 |
| 5,071,182 A * | 12/1991 | Mair | 294/12 |
| 5,154,114 A * | 10/1992 | Chang | 99/340 |
| 5,174,272 A * | 12/1992 | Clark | 126/242 |
| 5,183,304 A * | 2/1993 | Mair | 294/10 |
| 5,611,264 A * | 3/1997 | Studer | 99/340 |
| 5,775,315 A * | 7/1998 | Baykal | 126/25 R |
| 5,950,614 A * | 9/1999 | Guinnane | 126/25 R |
| 6,055,901 A * | 5/2000 | Gantos et al. | 99/412 |
| 6,076,451 A * | 6/2000 | Studer | 99/340 |
| 6,182,650 B1 * | 2/2001 | Tuttle | 126/30 |
| 6,257,125 B1 * | 7/2001 | Pate | 99/339 |
| 6,314,955 B1 * | 11/2001 | Boetcker | 126/9 R |
| 6,516,792 B1 * | 2/2003 | McDonald | 126/9 R |
| 6,711,993 B2 * | 3/2004 | Robertson | 99/448 |
| 6,755,188 B2 * | 6/2004 | Skidmore et al. | 126/25 R |
| 6,918,563 B2 * | 7/2005 | Tseng | 248/146 |
| 6,945,243 B1 * | 9/2005 | Walker et al. | 126/9 R |
| 7,383,836 B2 * | 6/2008 | Klemming | 126/506 |
| 7,766,004 B1 * | 8/2010 | Bourgeois | 126/25 R |
| 8,087,410 B2 * | 1/2012 | Gregory | 126/275 E |
| 2003/0015186 A1 * | 1/2003 | McDonald | 126/9 R |
| 2006/0225724 A1 * | 10/2006 | Turner | 126/9 R |
| 2012/0073561 A1 * | 3/2012 | Gregory | 126/25 R |

\* cited by examiner

DUTCH OVEN LID HOLDER

BACKGROUND OF THE INVENTION

The invention relates to cooking pots such as generally described as Dutch ovens. The pots have a removable lid.

When using a Dutch oven for cooking a problem that presents itself is what to do with the lid when the food must be stirred or when it is time to serve the food that has been cooked in the pot. The lid is relatively heavy so it is not comfortable to hold the lid while trying to stir the food or serve food out of the pot. When cooking outdoors quite often the lid is placed on the ground or some other convenient surface. Other state of the art for outdoor cooking apparatus will be described in the following patents.

The McDonald US patent application 2003/0015186 A1 relates to a multipurpose multi-component cooking apparatus for use in outdoor environments. More particularly, it relates to an improved cooking apparatus having a capability of being configured for use as a grilling device, an oven, and a turning spit while possessing means to be self-contained within the components comprising the cooking apparatus. The different components of the cooking apparatus provide a convenient storage medium and also a convenient medium for transporting the different components. The cooking apparatus has three telescoping legs having their top ends detachably secured to a ring. For convenience, the different components can be stored within the basin and dome shaped cover.

The Cronk U.S. Pat. No. 955,140 is directed to a collapsible portable camping apparatus. The flat sheet metal sections form an enclosure for fuel such as wood, straw or any other flammable fuel while camping. The top provides a support for pans to be heated by the flame from the burning fuel. The legs are collapsible The Boetcker U.S. Pat. No. 6,314,955 is directed to a collapsible barbeque and cooking stove. It has three legs that support the upper housing. It has a fire housing and a fuel pan and a fuel grate. During use, fuel is placed on the upper surface of the fuel grate.

The Alter U.S. Pat. No. 2,787,995 is directed to a cooker mounted on a stand having three legs. The lid has a hand grip on its top end but there is no structure for hanging it.

The Mair U.S. Pat. No. 5,071,182 is directed to apparatus for grasping and stably lifting lids of Dutch ovens. There is not any structure shown for hanging the lid once it has been removed.

The Guinnane U.S. Pat. No. 5,950,614 is directed to a portable cooking utensil for creating toasted marshmallows while outdoors.

The Walker et al U.S. Pat. No. 6,945,243 is directed to a Dutch Oven stand.

The Tuttle U.S. Pat. No. 6,182,650 is directed to a Dutch Oven assembly that includes an adjustable-height tripod stand which supports an easy-to-level snap-in-place steel burner plate for a Dutch Oven pot. The assembly includes two miniature tripod stands on which rests the Dutch Oven pot and lid for convenience. This patent does not disclose the structure for supporting the Dutch oven lid in a position beneath its ring that supports the Dutch Oven pot.

It is an object of the invention to provide a novel Dutch oven lid holder that is portable.

It is also an object of the invention to provide a novel Dutch oven lid holder that is collapsible and easily set up.

It is another object of the invention to provide a novel Dutch oven lid holder that is economical to manufacture and market.

It is a further object of the invention to provide a novel Dutch oven lid holder that allows the Dutch oven lid to support hot coals whose heat can keep food in the Dutch oven pot supported there above at a proper serving temperature.

It is also an object of the invention to provide a novel Dutch oven lid holder that can be used with different sized Dutch oven pots.

SUMMARY OF THE INVENTION

The Dutch oven lid holder has a horizontally oriented support ring. A support stand assembly has three upright oriented support leg members and their top ends are connected to the support ring. The height of the individual support leg members can be adjusted to accommodate a support surface for the support stand assembly that is not perfectly flat.

A lid support assembly is formed from several different parts. It has an elongated horizontally oriented tubular sleeve portions having a tension coil spring fed through it. The opposite ends of the spring are detachably connected to brackets on the support ring. A T-connection portion extends downwardly from the tubular sleeve portion and it threadably receives the top end of an anchor leg member. The anchor leg member has a rod portion having a hook formed on its bottom end.

Each support leg member has an anchor arm extending inwardly therefrom adjacent its bottom end. These anchor arms have a hook portion that presses downwardly against the annular upstanding lip of the Dutch oven lid when it is positioned there below. Proper tension can be maintained to hold the Dutch oven lid stationary by screwing the top end of the anchor leg upwardly or downwardly in the T-connector portion. This keeps the coil spring under tension to hold the Dutch oven lid firmly against the hooked portions of the support leg members.

When being used, the Dutch oven pot would be positioned on top of the support ring. If the pot has a larger diameter than the ring, it will rest on the top surface of the support ring. If the diameter of the oven pot is smaller it can rest on the top surface of the tubular sleeve portion of the lid support assembly. With the lid removed from the Dutch oven pot and being secured beneath the support ring in the lid storage space, it is easy to stir or serve food from the Dutch oven pot. Also hot coals can be placed on the top surface of the Dutch oven lid to keep the food in the Dutch oven pot heated. The upwardly extending lip on the peripheral edge of the lid will keep the hot coals from falling off the lid.

DESCRIPTION OF THE PREFERRED EMBODIMENT

Figures 1, 2:
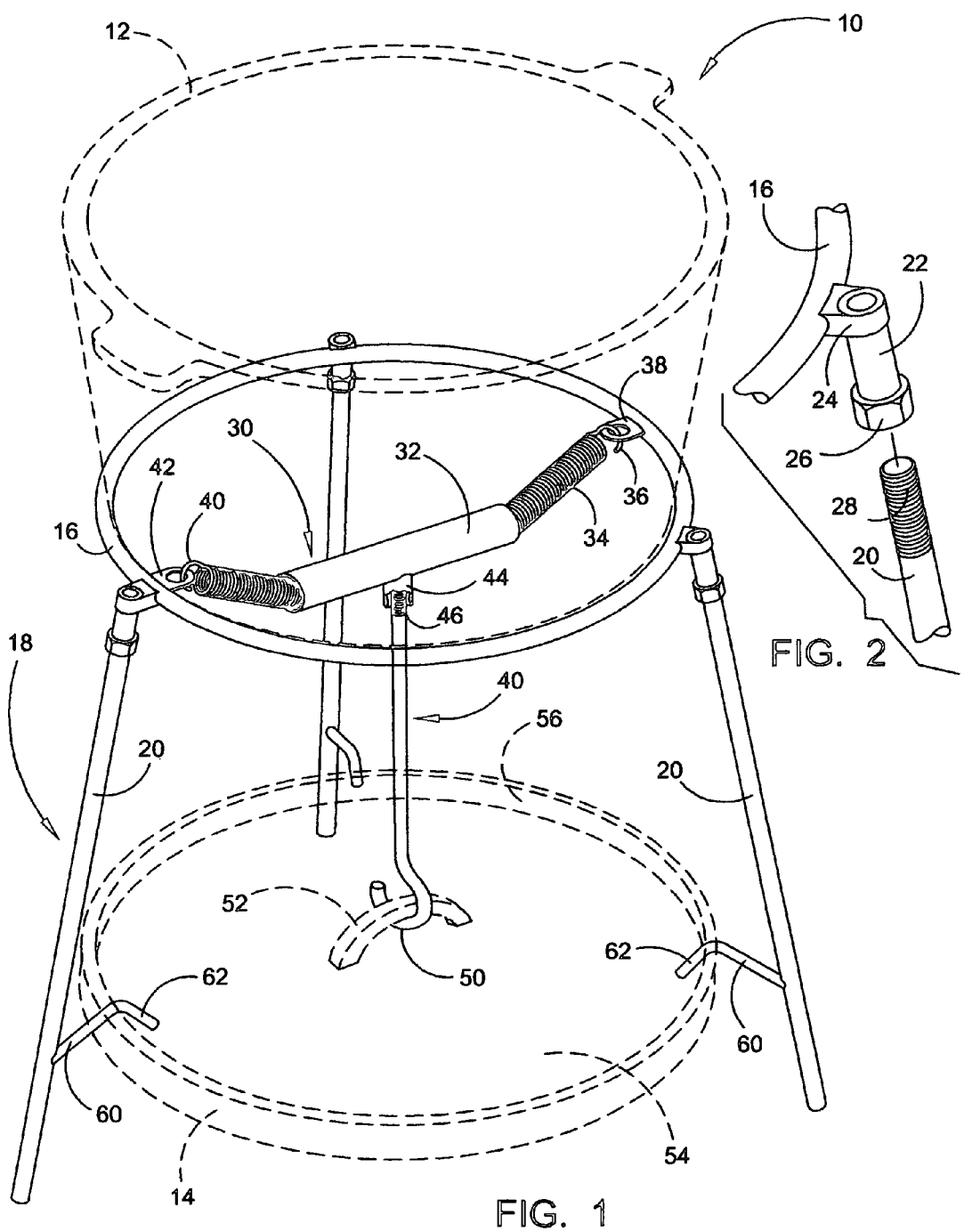
FIG. 1 is a front perspective view of the Dutch oven lid holder.
FIG. 2 is a partial exploded perspective view showing the structure that allows the support leg members to be telescopically attached to the support ring.

The Dutch oven lid holder will now be described by referring to FIGS. 1 and 2 of the drawing. The Dutch oven lid holder is generally designated numeral 10. A Dutch oven pot 12 and a Dutch oven lid 14 are shown in phantom lines.

Support stand assembly 18 is formed from three upright oriented support leg members 20 and would normally be made from steel rod material.

The top ends of the support leg members are telescopically received in tubular coupling members 22. These tubular coupling members have a head portion 24 that is welded or otherwise attached to the outer surface of steel rod support ring 16. A fastener nut or similar structure 26 has internal threads that allow the external threads 28 on the top ends of support leg members 20 to be screwed inwardly and outwardly in fastener nut 26 to lengthen or shorten the height of the support leg member.

A lid support assembly 30 is detachably secured within the perimeter of support ring 16. It has an elongated metal tubular sleeve portion 32 having an elongated tension coil spring 34 fed therethrough. Spring 34 has a hook-shaped tip 36 that is detachably engaged in an aperture in bracket 38. A hook-shaped tip 40 on the other end of coil spring 34 is detachably secured in an aperture in bracket 42. A T-connector portion 44 is rigidly secured to the bottom surface of tubular sleeve portion 32. T-connector portion has internal threads that engage external threads 46 on the top end of anchor leg 48. Anchor leg 48 is a rod member having a hook 50 formed on its bottom end. Hook 50 is removably engagable in handle 52 extending upwardly from the top surface 54 of Dutch oven lid 14. An annular lip 56 extends around the peripheral edge of top surface 54. In use, this surface would be covered with hot coals to keep the food in the Dutch oven pot warm.

A plurality of anchor arms 60 extend inwardly from the respective support leg members 20. Each anchor arm has a hook portion 62 that maintains a downward force against top surface 54 of Dutch oven lid 14 and keeps spring 34 under proper tension.

An alternative embodiment of the Dutch oven holder has been designed having three support leg members 20 that can be pivoted inwardly beneath support ring 16. The tubular coupling members would be horizontally oriented and welded to the support ring. The top ends of the support leg members would have a short shaft portion extending transversely to the longitudinal axis of the support leg members. The short shaft portion would have external threads adjacent its outer end. The short shaft portion would be telescopically inserted through the tubular coupling members end. There would be anchor arms 60 extending inwardly from the respective support leg members. There would be structure to limit how far the support leg members can be pivoted outwardly at their bottom ends.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various components described above may be altered, all without departing from the spirit or scope of the invention as defined in the appended Claims.

The invention claimed is:

1. A Dutch oven lid holder comprising:
   a horizontally oriented support member for an oven pot;
   a support stand assembly connected to said horizontally oriented support member to position said horizontally oriented support member a predetermined height above a surface upon which said support stand assembly would be placed; said support assembly defining a lid storage space beneath said horizontally oriented support member; and
   a lid support assembly connected to said horizontally oriented support member for supporting an oven lid in said lid storage space, said lid support assembly comprising:
      a vertically oriented anchor leg having a top end and a bottom end;
      a substantially horizontally oriented tubular sleeve portion;
      an elongated coil spring having a first end and a second end; said coil spring being fed through said horizontally oriented tubular sleeve portion;
      a first bracket and a second bracket for connecting said respective first and second ends of said coil spring to diametrically opposed sides of said horizontally oriented support member; and
      a connector for connecting said top end of said anchor leg to said horizontally oriented tubular sleeve portion.

2. A Dutch oven lid holder as recited in claim 1 wherein said horizontally oriented support member is a closed loop support ring.

3. A Dutch oven lid holder as recited in claim 2 wherein said closed loop support ring is a metal rod.

4. A Dutch oven lid holder as recited in claim 1 wherein said support stand assembly comprises at least three support leg members each having a top end and a bottom end; said top ends of said support leg member connected to said horizontally oriented support member.

5. A Dutch oven lid holder as recited in claim 1 wherein said horizontally oriented support member is a closed loop support ring.

6. A Dutch oven lid holder as recited in claim 5 wherein said anchor leg is a metal rod with a hook formed on said bottom end of said anchor leg for engaging a handle on a top of a Dutch oven lid.

\* \* \* \* \*